(12) United States Patent
Shimizu (10) Patent No.: US 11,221,815 B2
(45) Date of Patent: Jan. 11, 2022

(54) DISPLAY SYSTEM, DISPLAY DEVICE, AND DISPLAY METHOD

(71) Applicant: NEC Display Solutions, Ltd., Tokyo (JP)

(72) Inventor: Takashi Shimizu, Tokyo (JP)

(73) Assignee: SHARP NEC DISPLAY SOLUTIONS, LTD., Tokyo (JP)

( * ) Notice: Subject to any disclaimer, the term of this patent is extended or adjusted under 35 U.S.C. 154(b) by 75 days.

(21) Appl. No.: 15/552,703

(22) PCT Filed: Feb. 25, 2015

(86) PCT No.: PCT/JP2015/055396
§ 371 (c)(1),
(2) Date: Aug. 22, 2017

(87) PCT Pub. No.: WO2016/135881
PCT Pub. Date: Sep. 1, 2016

(65) Prior Publication Data
US 2018/0267760 A1    Sep. 20, 2018

(51) Int. Cl.
*G06F 3/14*        (2006.01)
*H04N 9/77*        (2006.01)
(Continued)

(52) U.S. Cl.
CPC .......... *G06F 3/1415* (2013.01); *G06F 3/1446* (2013.01); *G09G 5/006* (2013.01);
(Continued)

(58) Field of Classification Search
CPC ..... G06F 3/1415; G06F 3/1446; G09G 5/006; G09G 5/10; G09G 2320/0233;
(Continued)

(56) References Cited

U.S. PATENT DOCUMENTS

2002/0183590 A1* 12/2002 Ogawa ............... A61B 1/00041
600/117
2005/0275649 A1* 12/2005 Yokoyama ............. G09G 5/006
345/204
(Continued)

FOREIGN PATENT DOCUMENTS

CN        1500345 A    5/2004
CN      101202032 A    6/2008
(Continued)

OTHER PUBLICATIONS

International Search Report (ISR) (PCT Form PCT/ISA/210), in PCT/JP2015/055396, dated Jun. 2, 2015.
(Continued)

*Primary Examiner* — John W Miller
*Assistant Examiner* — Omer Khalid
(74) *Attorney, Agent, or Firm* — McGinn I.P. Law Group, PLLC.

(57) ABSTRACT

A display device includes a video input part for receiving video signals based on video input signals received by another display device, a communication controller for receiving communication data, representing any change occurring in video input signals, from another display device, a video signal determination part for determining video signals input by the video signal input part based on communication data received by the communication controller, and a video signal adjustment part for adjusting video signals based on the result of determination made by the video signal determination part.

14 Claims, 7 Drawing Sheets

(51) Int. Cl.
  *G09G 5/10* (2006.01)
  *G09G 5/00* (2006.01)
(52) U.S. Cl.
  CPC ............... *H04N 9/77* (2013.01); *G09G 5/10* (2013.01); *G09G 2320/0233* (2013.01); *G09G 2320/0271* (2013.01); *G09G 2320/0673* (2013.01); *G09G 2340/0407* (2013.01); *G09G 2360/16* (2013.01); *G09G 2370/045* (2013.01); *G09G 2370/10* (2013.01); *G09G 2370/12* (2013.01)
(58) Field of Classification Search
  CPC ... G09G 2320/0271; G09G 2320/0673; G09G 2320/0407; G09G 2360/16; G09G 2370/10; G09G 2370/045; G09G 2370/12; H04N 5/66; H04N 9/77
  USPC ............................................. 345/1.1; 348/383
  See application file for complete search history.

(56) References Cited

U.S. PATENT DOCUMENTS

| | | | | |
|---|---|---|---|---|
| 2010/0091042 | A1* | 4/2010 | Inoue | G09G 3/2025 345/690 |
| 2011/0025695 | A1* | 2/2011 | Yoshida | G09G 5/006 345/501 |
| 2011/0095965 | A1* | 4/2011 | Yoneoka | G06F 3/1446 345/1.1 |
| 2012/0019722 | A1* | 1/2012 | Kwisthout | H04N 21/4355 348/564 |
| 2014/0267471 | A1 | 9/2014 | Harada et al. | |
| 2015/0371581 | A1* | 12/2015 | Chuman | G09G 5/00 345/593 |

FOREIGN PATENT DOCUMENTS

| | | |
|---|---|---|
| CN | 101331771 A | 12/2008 |
| CN | 102054451 A | 5/2011 |
| CN | 104053031 A | 9/2014 |
| EP | 2 105 916 A1 | 9/2009 |
| JP | 2004-186803 A | 7/2004 |
| JP | 2008-022049 A | 1/2008 |
| JP | 2008-145902 A | 6/2008 |
| JP | 2012-138712 A | 7/2012 |
| JP | 2012-222637 A | 11/2012 |
| JP | 2014-179875 A | 9/2014 |

OTHER PUBLICATIONS

Chinese Office Action, dated Jun. 5, 2019, in Chinese Application No. 201580076801.9 and English Translations thereof.
Chinese Notice of Allowance, dated Dec. 31, 2019, in Chinese Application No. 201580076801.9 and English Translation thereof.
Yuan Xin-yu, Research on real-time display Algorithm of Cascading Screen for Automated Reserve Warehouse in EMU Depot, Railway Computer Application, 2010, vol. 19, No. 2, pp. 14-16.

* cited by examiner

| | | | |
|---|---|---|---|
| AVI Information | Type | | 2 |
| | Version | | 1/2 |
| | Scan Information | | No Data/overscan/underscan |
| | Bar Information | | NO SETTING/VERTICAL/HORIZONTAL/ASPECT |
| | Active Format Information | | INVALID/VALID |
| | RGB or YCbCr | | RGB/YCbCr 4:4:4 / YCbCr 4:2:2 |
| | Active Aspect Ratio | | Picture/4:3/16:9/14:9/box16:9/box14:9/<br>box>16:9/4:3(14:9)/16:9(14:9)/16:9(4:3) |
| | Picture Aspect Ratio | | Picture Aspect Ratio NO SETTING/4:3/16:9 |
| | Scaling | | NO SETTING/HORIZONTAL/VERTICAL/ASPECT |
| | Colorimetry | | NO SETTING/SMPTE/ITU709/Extend |
| | Video Code | | 0~59 |
| | Repetition | | 1~10 |
| | Top Bar | Bottom Bar | 0~65535 |
| | Left Bar | Right Bar | |
| | RGB Quantization Range | | Default/Limited/Full |
| | Extended Colorimetry | | xvYCC601/xvYCC709 |
| | IT Content | | No Data/IT Content |

DISPLAY SYSTEM, DISPLAY DEVICE, AND DISPLAY METHOD

TECHNICAL FIELD

The present invention relates to a display device, a display system, and a display method.

BACKGROUND ART

Multi-screen display devices having multiple video displays are known and designed such that, due to power-on events, they transmit instructions for starting luminance correcting processes to slave devices.

Display devices using multiple displays subjected to daisy-chain connection have been known and designed such that video signal supplied from signal sources are sequentially forwarded from former-stage displays to latter-stage displays.

In addition, liquid-crystal television devices are known and designed to automatically determine either a full range or a limited range.

Moreover, video display devices are known and designed to sequentially measure luminance levels for video signals with respect to each of horizontal lines counted from the uppermost one on screen.

For example, the aforementioned technologies are disclosed by Patent Literatures 1 through 4.

CITATION LIST

Patent Literature

Patent Literature 1: Japanese Patent Application Publication No. 2012-222637
Patent Literature 2: Japanese Patent Application Publication No. 2012-138712
Patent Literature 3: Japanese Patent Application Publication No. 2008-22049
Patent Literature 4: Japanese Patent Application Publication No. 2004-186803

SUMMARY OF INVENTION

Technical Problem

Video input signals input to display devices may include video relevant information such as video gradation information and scaling for video display range information. For example, HDMI (High-Definition Multimedia Interface) (Registered Trademark) signals, i.e. one type of video input signals, may include Infoframe information, including AVI (Auxiliary Video Information), as video relevant information. For example, AVI includes parameters "RGB Quantization Range" representing either a limited range, e.g. 16-235 gradients as the gradation range of RGB signals, or a full range, e.g. 0-256 gradients. In addition, AVI includes parameters "Scan Information" representing video scaling.

Display devices receiving HDMI signals can adjust scaling and gradation of displayed videos upon confirming Infoframe information included in video input signals.

For the purpose of reducing video distributors for distributing video input signals, conventionally-known multisystem display devices using multiple displays (monitors) subjected to daisy chain connection are each designed to convert video input signals, input to a video input part of the former-stage display, into video signals and thereby output the converted video signals to its own panel while outputting them to the latter-stage display device. When outputting video signals at DP (Display Port), for example, it is impossible to incorporate video relevant information into video signals output from DP. Therefore, even when HDMI signals serve as video input signals including video relevant information, the latter-stage monitor cannot receive video relevant information included in HDMI signals. That is, the former-stage display device can adjust the displayed video based on video relevant information included in video input signals input thereto, but the latter-stage display device receiving video signals missing video relevant information cannot adjust the displayed video based on the video relevant information. This may cause inconsistency between videos displayed on the former-stage display device and videos displayed on the latter-stage display device. When the video relevant information includes the gradation range information of RGB signals, for example, the latter-stage display device cannot adjust the gradation range so that tints of videos displayed on the latter-stage monitor may differ from tints of videos displayed on the former-stage monitor. When the video relevant information include the scaling information, the latter-stage monitor cannot adjust scaling such that black-colored bands (including shapes of black-colored frames) may be displayed in the periphery of the latter-stage monitor.

Thus, the present invention aims to provide a display device, a display system, a display method, and a display program, which allow for adjustment of videos displayed on display devices unable to directly receive video input signals.

Solution to Problem

According to one embodiment of the present invention, a display device includes a video input part configured to receive a video signal based on a video input signal received by another display device; a communication controller configured to receive communication data, representing any change occurring in the video input signal, from another display device; a video signal determination part configured to determine the video signal input by the video input part based on the communication data received by the communication controller; and a video signal adjustment part configured to adjust the video signal based on the result of determination made by the video signal determination part.

Advantageous Effects of Invention

It is possible to provide a display device, a display method, and a display program, which allow for adjustment of videos displayed on display devices unable to directly receive video input signals.

DESCRIPTION OF EMBODIMENTS

Hereinafter, embodiments of display devices will be described with reference to the drawings.

First Embodiment

Figure 1:
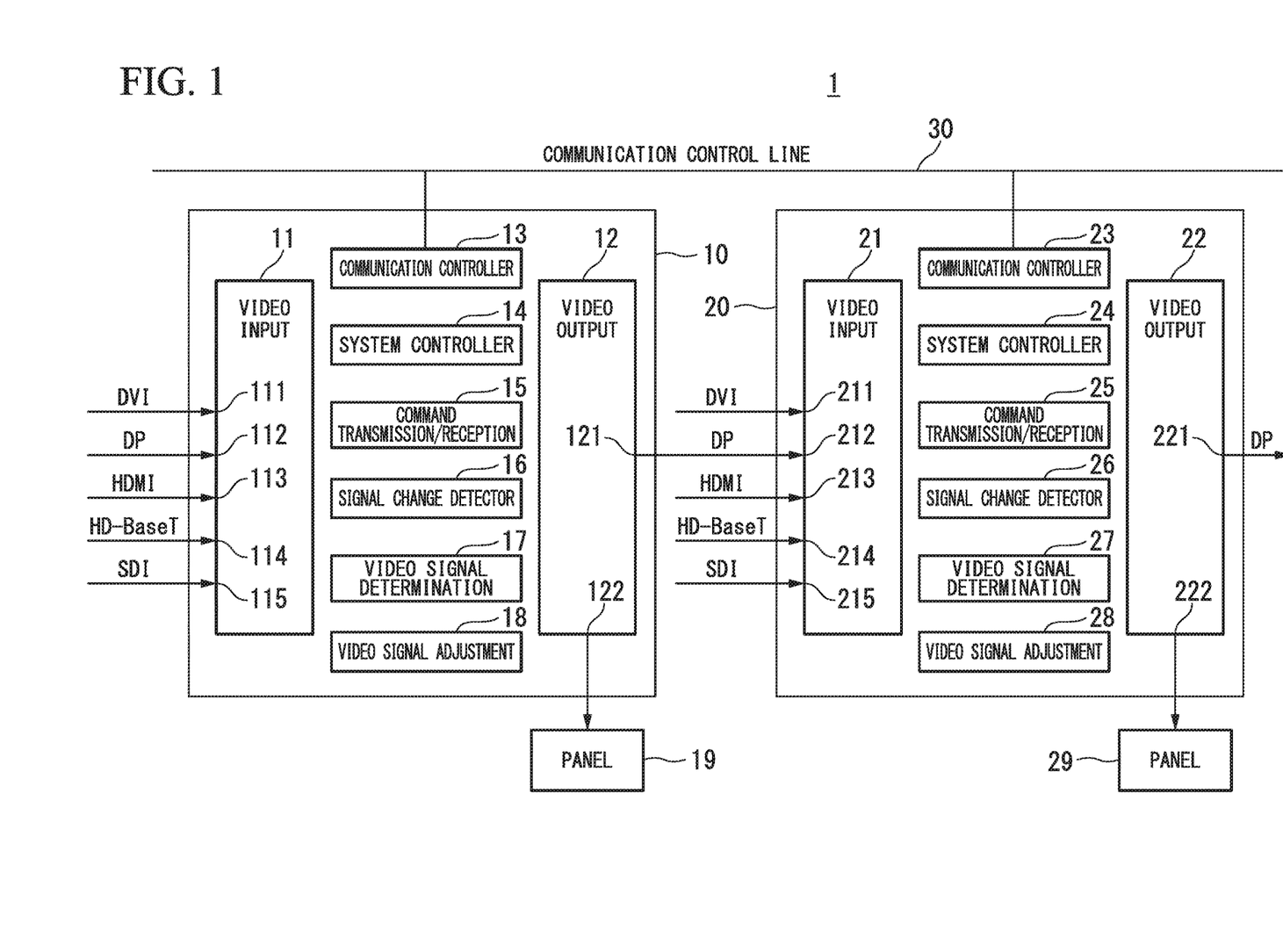
FIG. 1 is a functional block diagram showing the configuration of a display system according to the first embodiment.

First, the display system of the first embodiment will be described with reference to FIG. 1. FIG. 1 is a functional block diagram showing the configuration of a display system 1 according to the first embodiment.

In FIG. 1, the display system 1 includes a first display device 10 exemplifying a first display device, a second display device 20 exemplifying a second display device or its subsequent display device, and a communication control line 30. The present embodiment refers to an example of the display device including two display devices, i.e. the first display device 10 and the second display device 20; but it is possible to reconfigure the display system by further connecting a third display device or its subsequent display device following the second display device 20 by way of daisy chain connection.

In the first embodiment, the first display device 10 and the second display device 20 have the same device configuration. That is, the first embodiment may exemplify the display system configured of a first display device, serving as a display device receiving a video input signal, and a second display device or its subsequent display device each having the same configuration as the first display device. By constructing the display system having multiple display device each having the same device configuration, it is possible to arrange display devices without considering the order of connecting display devices.

The first display device 10 includes a video input part 11, a video output part 12, a communication controller 13, a system controller 14, a command transmission/reception part 15, a signal change detector 16, a video signal determination part 17, a video signal adjustment part 18, and a panel 19. The video input part 11 includes a DVI (Digital Visual Interface) input port 111, a DP input port 112, an HDMI input port 113, an HD-BaseT (Registered Trademark) input port 114, and an SDI (Serial Digital Interface) input port 115. FIG. 1 shows an example of arrangement that the panel 19 is connected externally of the first display device 10, but the panel 19 should be included in the display device 10. In this connection, the present embodiment may refers to a display device that does not include a panel but controls the panel to display images. The same explanation should be applied to the panel 29 equipped with the second display device 20, which will be described below.

The second display device 20 includes a video input part 21, a video output part 22, a communication controller 23, a system controller 24, a command transmission/reception part 25, a signal change detector 26, a video signal determination part 27, a video signal adjustment part 28, and the panel 29. The video input part 21 includes a DVI input port 211, a DP input port 212, an HDMI input port 213, an HD-BaseT input port 214, and an SDI input port 215.

The communication control line 30 is a control line allowing for communication established between the first display device 10 and the second display device 20. For example, it is possible to use priority LAN (Local Area Network) using RS-232C or Ethernet (Registered Trademark). It is possible to connect unillustrated entities such as PC, a third display device or its subsequent display device to the communication control line 30.

First, the device configuration of the first display device 10 will be described below.

The video input part 11 has interfaces dedicated to video input signals for the DVI input port 111, the DP input port 112, the HDMI input port 113, the HD-BaseT input port 114, and the SDI input port 115 respectively; hence, the video input part 11 is connectible to input cables for respective interfaces. The video input part 11 is able to switch over multiple types of video input signals. For example, it is possible to switch over video input signals by way of user's pressing buttons or user's operations to explicitly select signals. Alternatively, it is possible to switch over video input signals by means of the video input part 11 for detecting physical connection of an input cable thereto or for detecting video input signals input thereto.

The video output part 12 includes a DP output port 121 and a panel connection port 122. The present embodiment is described on the precondition that DP signals are output as video signals from the DP output port 121 and the panel connection port 122. Herein, DP signals output from the DP output port 121 are input to the DP input port 212 of the video input part 21 of the second display device 20. That is, a second display device or its subsequent display device subjected to daisy connection may receive DP signals from its preceding display device. Video signals output from the panel connection port 122 are supplied to the panel 19.

The present embodiment refers to an example of the display system 1 including the second display device 20 serving as each of second and subsequent display devices. However, the device configuration may include three or more display devices connected together.

The present embodiment refers to an example of linearly connecting multiple display devices by way of daisy chain connection such that video output ports and video input ports are coupled together one-by-one so as to transmit video signals. However, it is possible to reconfigure the display system such that a single video output port is coupled with multiple video input ports so as to transmit video signals.

Next, the relationship between video input signals input to the video input part 11 and video signals output from the video output part 12 will be described below.

When the video input part 11 receives HDMI signals as video input signals, for example, it is necessary to provide a distributor for outputting HDMI signals in order that the video output part 12 can distribute and output HDMI signals. Similarly, in second and subsequent display devices, it is necessary to provide distributors for distributing and outputting HDMI signals to latter-stage display devices. In a display device capable of receiving multiple types of video input signals, it is necessary to provide distributors suiting to the number of video input signals to cope with the increased number of types of video input signals; this may increase costs. For example, a large-scale display system such as a public display uses a large number of display devices. Therefore, it is possible to eliminate distributors by inputting into second and subsequent display devices a single video signal such as a DP signal and a DVI signal by way of daisy chain connection. When a video input signal differs from a video signal, however, the video relevant information included in the video input signal supplied to a first display device may not be included in the video signal to be outputted. When a video input signal is an HDMI signal while a video signal forwarded to second and subsequent display devices is a DP signal, for example, the video signal to be outputted may miss the video relevant information of the HDMI signal.

The communication controller 13 communicates with the communication controller 23 of the second display device 20 through the communication control line 30. For example, the communication controller 13 is a network controller. The communication controller 13 transmits communication data, representing variations of video input signals supplied to the video input part 11, to the communication controller 23. The communication controller 13 can transmit communication data according to communication procedures based on communication protocols for the communication control line 30. Even when third and subsequent display devices are connected to the communication control line 30, the communication controller 13 can transmit communication data, representing variations of video input signals, to third and subsequent display devices. In this connection, the present embodiment refers to the communication controller 13 that controls wired communication through the communication control line 30, however, the communication controller 13 may control wireless communication.

The system controller 14 entirely controls the first display device 10. The present embodiment shows that the system controller 14 controls the video input part 11, the video output part 12, the communication controller 13, the command transmission/reception part 15, the signal change detector 16, the video signal determination part 17, and the video signal adjustment part 18. For example, the system controller 14 includes a CPU (Central Processing Unit) to operate according to programs.

When any change occurs in video input signals supplied to the video input part 11, the command transmission/reception part 15 generates and transmits a communication command, representing variations of video input signals, to the communication controller 13. The communication controller 13 transmits communication data, including the communication command transmitted thereto, to the communication control line 30 according to the communication protocol. In this connection, a command reception function for the command transmission/reception part 15 will be described later in conjunction with the command transmission/reception part 25.

The signal change detector 16 detects whether or not any change occurs in video input signals supplied thereto from the video input part 11. In the present embodiment, the signal change detector 16 detects variations of video input signals requiring readjustment for video signals due to any change occurring in video input signals supplied thereto from the video input part 11. For example, it refers to any change occurring in the gradation range and/or the scaling indicated by video input signals. For example, it is possible to detect variations of video input signals by determining any change occurring in video relevant information, which will be described later with reference to FIG. 2. Alternatively, it is possible to detect variations of video input signals by detecting user's explicitly switching to one of video input signals supplied to video input part 11.

The first display device 10 does not necessarily use the video signal determination part 17. That is, the first display device 10 may use the video signal determination part 17 when it serves as a second display device or its subsequent display device. The details of the operation of the video signal determination part 17 adapted to the second display device 20 will be described later.

The video signal adjustment part 18 adjusts video input signals, supplied to the video input part 11, according to the display specification of the panel 19 so as to send the adjusted video signals to the video output part 12. For example, the video signal adjustment part 18 adjusts video signals to be outputted based on video relevant information included in video input signals supplied thereto from the video input part 11. Herein, the video relevant information will be described with reference to FIG. 2.

Figure 2:
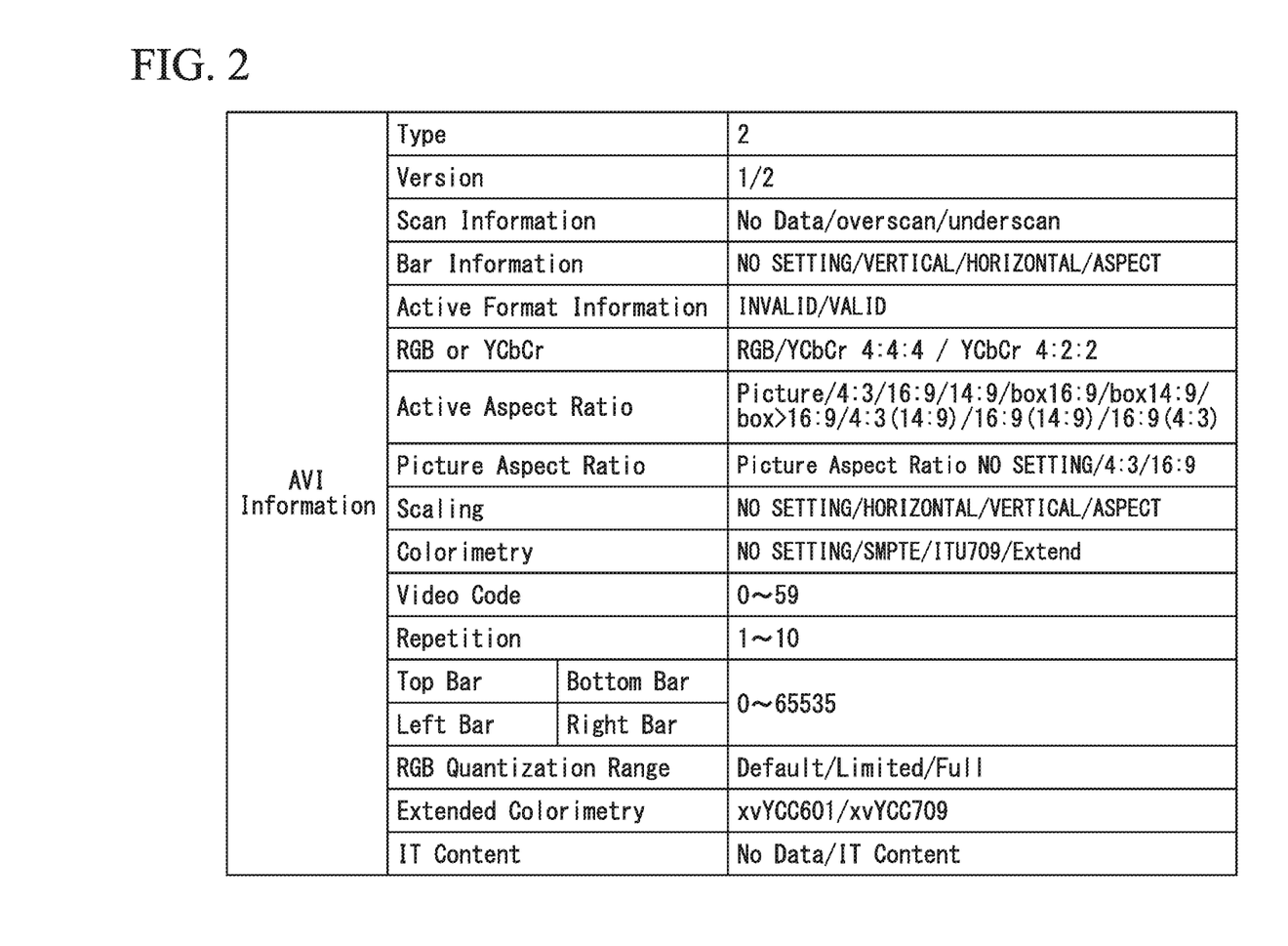
FIG. 2 shows a table for AVI Information included in Infoframe information.

FIG. 2 is a table describing details of AVI Information included in Infoframe information representing an example of video relevant information included in an HDMI signal serving as a video input signal.

Video input signals described in FIG. 1 may include HDMI signals including video relevant information. The present embodiment refers to an example of video relevant information included in an HDMI signal serving as a video input signal.

FIG. 2 shows various pieces of video relevant information included in AVI Information. The present embodiment refers to an example of adjusting video signals using "Scan Information" and "RGB Quantization Range" among various pieces of video relevant information. Therefore, the following description refers to "Scan Information" and "RGB Quantization Range" among various pieces of video relevant information shown in FIG. 2, thus omitting descriptions concerning other pieces of video relevant information.

The aforementioned "Scan Information" is the scaling information for adjusting the display range of video. For example, over-scan indicates a scaling factor greater than 0%, and therefore the over-scan will be set to 15% in order to output a video to a television receiver. In contrast, under-scan indicates a scaling factor less than 0%. Some of devices outputting HDMI signals may change their scaling factors suited to destinations of connecting HDMI signals, and therefore those devices may include "Scan Information", representing scaling information for HDMI signals to be outputted, as video relevant information for HDMI signals to be outputted. Therefore, second and subsequent display devices unable to obtain "Scan Information" may not carry out proper scaling so as to cause black bands in the periphery of a panel.

The aforementioned "RGB Quantization Range" indicates the gradation range of RGB signals. For example, "Limited" (i.e. the limited range) for "RGB Quantization Range" indicates 16-235 gradients as the gradation range of RGB signals. In addition, "Full" (i.e. the full range) for "RGB Quantization Range" indicates 0-255 gradients as the gradation range of RGB signals. It is not possible to properly reproduce tints of videos displayed on screen when the gradation range of video signals differs from the gradation range of videos displayed on the display device. When the limited range of 16-235 gradients is set to the gradation range of video signals while the full range of 0-255 gradients is set to the gradation range of the display device, for example, the display device may display a whitish color as a black color of video signals since the black color of video signals indicated by 16 gradients is higher than the black color of the display device indicated by 0 gradients by sixteen levels. On the other hand, when the full range of 0-256 gradients is set to the gradation range of video signals while the limited range of 16-235 gradients is set to the gradation range of the display device, the display device may entirely display dark and depressed tints of videos compared to original tints of videos. Therefore, second and subsequent display devices unable to obtain "RGB Quantization Range" may not properly display tints of videos.

As described in FIG. 1, the signal change detector 1 detects whether or not any change occurs in video input signals based on the aforementioned value representing either "Scan Information" or "RGB Quantization Range" included in video input signals.

This is the end of description concerning AVI Information as an example of video relevant information referring to FIG. 2.

Referring back to FIG. 1, the first embodiment is designed such that the video signal adjustment part 18 adjusts the gradation range and the scaling of video input signals input thereto from the video input part 11 based on the aforementioned video relevant information, thus outputting video signals, which are adjusted in gradation range and scaling, to the panel 19 through the video output part 12. In the present embodiment, it is assumed that both the panels 19 and 29 involves the full range as the gradation range. That is, the video signal adjustment part 18 normally adjusts the gradation range of video input signals input thereto from the video input part 11 to the full range in conformity with the gradation range of the panel 19.

The panel 19 displays videos based on video signals (or DP signals) output from the panel connection port 122 of the video output part 12. In a multi-monitor system arranging multiple panels to adjoin together, the panel 19 should be disposed adjacent to the panel 29 connected to the second display device 20. For this reason, the multi-monitor system may undergo malfunction due to conspicuous incompatibilities between videos when the video displayed on the panel 19 differs from the video displayed on the panel 29 in terms of tints and screen sizes.

Next, the configuration of the second display device 20 will be described below. The configuration of the second display device 20 is identical to the configuration of the first display device 10. Therefore, descriptions concerning parts implementing the same operation as the first display device 10 are omitted here.

The video input part 21 receives video signals based on video input signals received by the first display device 10 exemplifying other display devices. The video input part 21 has interfaces for video input signals at the DVI input port 211, the DP input port 212, the HDMI input port 213, the HD-BaseT input port 214, and the SDI input port 215. In the display system 1 of the present embodiment, however, the video input part 112 is configured to normally receive DP signals so as not to use other input ports for receiving other signals. Since the video input part 21 is configured to be identical to the video input part 11, it is possible to use the second display device 20 as the first display device 10 configured to receive video input signals. In this connection, DP signals input to the DP input port 212 may not include video relevant information described in FIG. 2.

The communication controller 23 communicates with the communication controller 13 of the first display device 10 through the communication control line 30. The communication controller 23 receives communication data, representing variations of video input signals input to the video input part 11 of the first display device 10, from the communication controller 13. In this connection, the communication controller 23 carries out the same operation as the above operation even when a third or its subsequent display device is connected thereto.

When the communication controller 23 receives communication data, representing variations of video input signals, from the communication controller 13 of the first display device 10, the command transmission/reception part 25 notifies the video signal determination part 27 of an event indicating any change occurring in video input signals. The command transmission/reception part 25 has a command transmission function, which is described in the command transmission/reception part 15, as well.

The signal change detector 26 detects whether or not any change occurs in video input signals in the first display device 10 by way of the video input part 21. In the present embodiment, however, the video input part 21 is configured to normally receive DP signals through the DP input port; hence, the signal change detector 26 would not operate as part of the second display device 20.

The video signal determination part 27 determines the gradation range of video signals input by the video input part 21 based on communication data received by the communication controller 23. When the signal change detector 26 detects any change occurring in video input signals in the first display device 10, the video signal determination part 27 determines the gradation range of RGB signals indicating DP signals input to the video input part 21. Details of the video signal determination part will be described with reference to FIG. 3.

Figure 3:
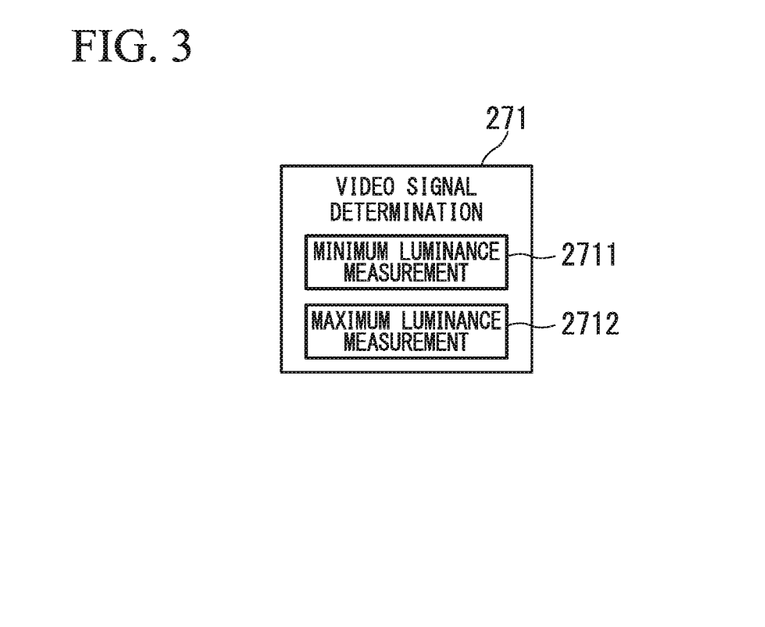
FIG. 3 is a block diagram showing a first configuration of a video signal determination part.

FIG. 3 is a block diagram showing a first configuration of the video signal determination part 27. FIG. 3 shows a video signal determination part 271, exemplifying the first configuration of the video signal determination part 27, which includes a minimum luminance measurement part 2711 and a maximum luminance measurement part 2712.

In the video signal determination part 271, the minimum luminance measurement part 2711 measures the minimum luminance of video signals while the maximum luminance measurement part 2712 measures the maximum luminance of video signals, and therefore it is determined whether or not a range of luminance, defined between the minimum luminance and the maximum luminance, falls within a predetermined range of luminance.

The minimum luminance measurement part 2711 measures the minimum luminance of RGB signals indicating DP signals input by the video input part 21. The maximum luminance measurement part 2712 measures the maximum luminance of RGB signals indicating DP signals input by the video input part 21. For example, the luminance of RGB signals can be detected based on the signal levels of RGB signals. When the minimum luminance measured by the minimum luminance measurement part 2711 is greater than a predetermined value of minimum luminance while the maximum luminance measured by the maximum luminance measurement part 2712 is less than a predetermined value of maximum luminance, the video signal determination part 271 determines that DP signals input by the video input part 21 fall within the limited range as the gradation range, which will be referred to as a first gradation range.

On the other hand, when the minimum luminance measured by the minimum luminance measurement part 2711 is less than the predetermined value of minimum luminance or when the maximum luminance measured by the maximum luminance measurement part 2712 is greater than the predetermined value of maximum luminance, the video signal determination part 271 determines that DP signals input by the video input part 21 fails within the full range as the gradation range, which will be referred to as a second gradation range having a broader gradation range than the first gradation range.

For example, it is possible to determine gradation by measuring luminance of RGB signals in a predetermined time. Alternatively, it is possible to determine gradation by measuring luminance of RGB signals corresponding to a video displayed at a predetermined position on the panel 29. Alternatively, it is possible to determine gradation based on the distribution of gradients included in video signals.

The video signal determination part 271 sends the determination result, indicating the limited range or the full range as the gradation range, to the video signal adjustment part 28.

This is the end of description concerning the video signal determination part 271 exemplifying the first configuration of the video signal determination part 27 with reference to FIG. 3.

Referring back to FIG. 1, the video signal adjustment part 28 adjusts video signals (e.g. DP signals) input by the video input part 21 based on the determination result concerning the gradation range made by the video signal determination part 27, thus outputting the adjusted video signals (e.g. DP signals) to the video output part 22.

The video signal adjustment part 28 has two processing modes for gradation processing. A first processing mode is a mode for carrying out an expansion process to expand DP signals input thereto from the limited range to the full range. A second processing mode is a mode for preventing the expansion process for DP signals input thereto. For example, two processing modes are set according to the presence/absence of a flag in the internal memory unit of the video signal adjustment part 28.

When the video signal determination part 27 indicates the limited range as the gradation range, the video signal adjustment part 28 sets a flag indicating the processing mode for the expansion process as the processing mode of gradation processing. That is, the video signal adjustment part 28 set to the processing mode for the expansion process expands the processing range for video signals input by the video input part 21 from the range of 16-235 gradients to the range of 0-255 gradients.

In the case of the full range as the gradation range indicated by the video signal determination part 27, the video signal adjustment part 28 releases the flag indicating the processing mode for the expansion process. That is, the video signal adjustment part 28 releasing the processing mode for the expansion process does not adjust the gradation range for full-range video signals input by the video input part 21.

Similar to the video signal adjustment part 28, the video signal adjustment part 28 has the function to adjust video signals based on video relevant information included in video input signals input to the video input part 21. That is, even when the second display device 20 serves as a first video signal for receiving video input signals, the video signal adjustment part 28 can adjust video signals based on video relevant information.

The panel 29 displays videos based on video signals (e.g. DP signals) output from the video output part 22 through the panel connection port 222. Due to the aforementioned setting of the gradation range, the gradation range of video signals becomes identical to the full range as the gradation range of the panel 19, and therefore, videos displayed on the panel 29 would be identical to videos displayed on the panel 19 in terms of tints. Thus, it is possible to prevent inconsistence between videos displayed on the panels 19 and 29.

As described above, the timing of the video signal determination part 271 determining the gradation range is to receive communication data representing any change occurring in video input signals with the first display device 10. It may not be possible to properly determine the gradation range for video signals input by the video input part 21 depending on the timing of the video signal determination part 271 determining the gradation range. In the present embodiment, the first display device 10 notifies the second or its subsequent display device of the timing to determine the gradation range through the communication control line 30; this notification will make it possible for the second or its subsequent display device to carry out a determination process of determining the gradation range for video signals at appropriate timing. That is, it is possible for the second or its subsequent display device to automatically determine the gradation range according to communication data representing any change occurring in video input signals transmitted by the first display device 10. Therefore, the communication data representing any change occurring in video input signals may function as a request command for automatic determination.

This is the end of the description concerning the functional block diagram showing the configuration of the display system 1 according to the first embodiment.

Next, the operation of the first display system 1 will be described with reference to FIGS. 4 and 5.

Figure 4:
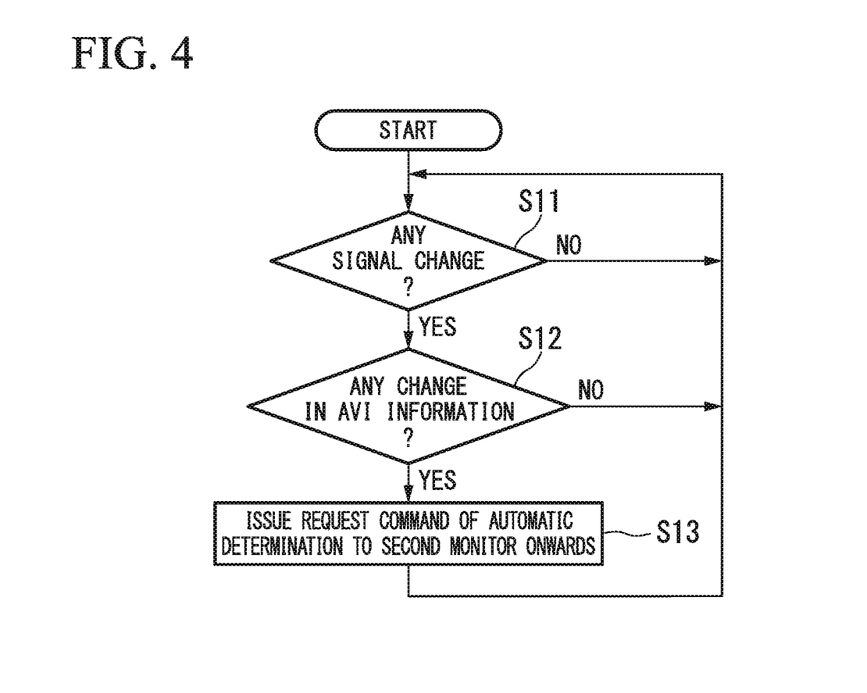
FIG. 4 is a flowchart showing the operation of a first display device.

FIG. 4 is a flowchart showing the operation of the first display device 10 exemplifying a first display device. FIG. 5 is a flowchart showing the operation of the second display device 20 exemplifying a second or its subsequent display device.

In FIG. 4, the signal change detector 16 determines whether or not any change occurs in video input signals input to the video input part 11 (step S11).

Upon determining that no change occurs in video input signals (step S11; NO), processing returns to step S11, and therefore step S11 will be repeated until any change found in video input signals.

Upon determining that any change occurs in video input signals (step S11; YES), the signal change detector 16 determines whether or not any change occurs in AVI Information described in FIG. 2 (step S12).

Upon determining that no change occurs in AVI Information (step S12; NO), processing returns to step S11.

Upon determining that any change occurs in AVI Information (step S12; YES), the signal change detector 16 generates a communication command representing any change occurring in video input signals for the command transmission/reception part 15. The generated communication command serving as a request command for automatic determination is transmitted to the second or subsequent display device by means of the communication controller 13 (step S13).

Figure 5:
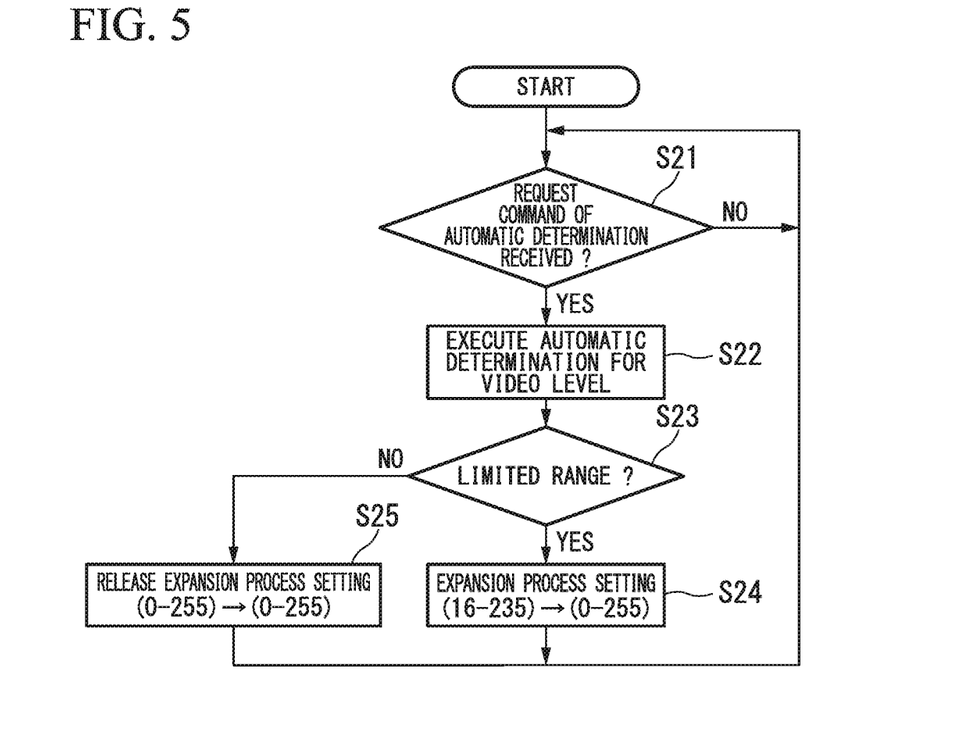
FIG. 5 is a flowchart showing the operation for a second display device or its subsequent display device.

In FIG. 5, the command transmission/reception part 25 of the second display device 20 determines whether or not to receive a request command for automatic determination (step S21)

Upon determining that a request command for automatic determination has not be received (step S21; NO), processing returns to step S21, and therefore step S21 will be repeated until reception of a request command for automatic determination.

Upon determining that a request command for automatic determination has been received (step S21; YES), the command transmission/reception part 25 notifies the video signal determination part 27 of reception of a request command, thus causing automatic determination for video levels of DP signals input by the video input part 21 (step S22).

After completion of executing step S22, the video signal determination part 27 determines whether or not the gradation range falls within the limited range (step S23).

When the gradation range falls within the limited range (step S23; YES), the video signal adjustment part 28 is set to the expansion process (step S24).

On the other hand, when the gradation range does not fall within the limited range (step S23; NO), the video signal adjustment part 28 is released from the setting of the expansion process (step S25).

After execution of step S24 or step S25, processing returns to step S21.

This is the end of the description concerning the operation of the display system 1 with reference to FIGS. 4 and 5.

Figure 6:
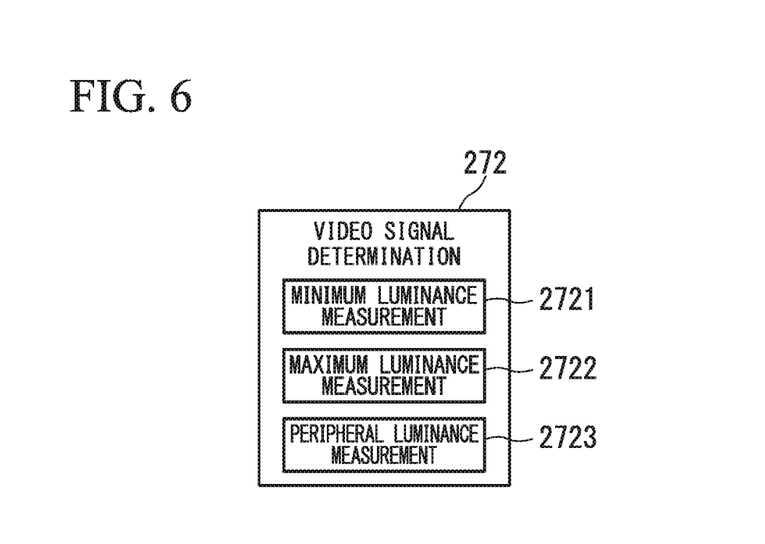
FIG. 6 is a block diagram showing a second configuration of a video signal determination part.

Next, another embodiment of the video signal determination part 27 will be described with reference to FIG. 6. FIG. 6 is a block diagram showing the configuration of a video signal determination part 272 exemplifying a second configuration of the video signal determination part 27. In FIG. 6, the video signal determination part 272 includes a minimum luminance measurement part 2721, a maximum luminance measurement part 2722, and a peripheral luminance measurement part 2723.

Similar to the minimum luminance measurement part 2711 described in FIG. 3, the minimum luminance measurement part 2721 measures the minimum luminance of RGB signals corresponding to DP signals input by the video input part 21. Similar to the maximum luminance measurement part 2712, the maximum luminance measurement part 2722 measures the maximum luminance of RGB signals corresponding to DP signals input by the video input part 21. Similar to the video signal determination part 271, the video signal determination part 272 determines whether the gradation range of DP signals input by the video input part 21 belongs to the limited range or the full range based on the results of determination made by the minimum luminance measurement part 2721 and the maximum luminance measurement part 2722.

The peripheral luminance measurement part 2723 measures the luminance for videos displayed at the periphery of the panel 29 based on video signals so as to confirm scaling applied to video signals (e.g. DP signals) input by the video input part 21. Herein, DP signals input by the video input part 21 do not include scaling information, which has been included in HDMI signals described in FIG. 2. Due to inconsistence between the scaling setting of DP signals and the scaling setting of the panel 29, black bands may occur in videos displayed at the periphery of the panel 29. For this reason, the peripheral luminance measurement part 2723 measures the luminance of videos displayed at the periphery of the panel 29 and thereby determines whether or not any black band occurs in the peripheral portion of videos, thus detecting inconsistence of scaling.

This is the end of the description concerning the block diagram showing the configuration of the video signal determination part 272.

Figure 7:
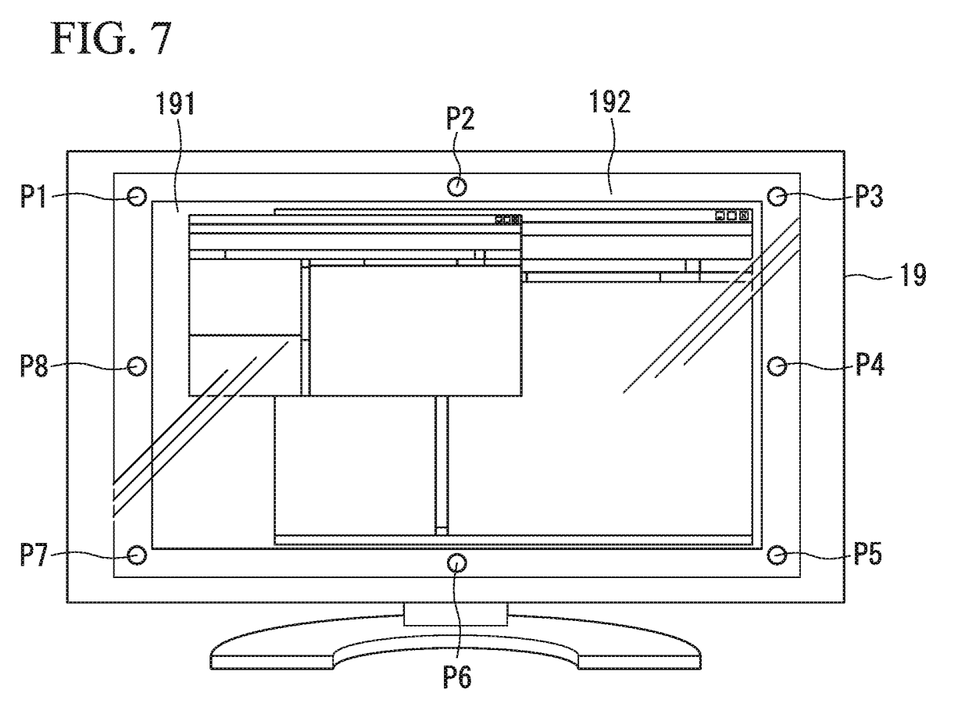
FIG. 7 is a schematic diagram showing measurement points allotted to the periphery of a panel.

Next, the peripheral portion of videos, which is displayed on the panel 29 and whose luminance is measured by the peripheral luminance measurement part 2723, will be described with reference to FIG. 7. FIG. 7 is a schematic diagram showing measurement points along the periphery of the panel 29.

In FIG. 7, a video 191 output from an unillustrated PC is displayed on the screen of the panel 29. Some black bands may occur in a periphery 192 of the screen of the panel 29. In the screen of the panel 29, eight measurement points P1 through P8 denoted using circular symbols are determined in a counterclockwise direction starting with the upper-left portion. In this connection, it is possible to arbitrarily determine the number of measurement points and the shape of measurement points. For example, it is possible to determine four measurement points at P1, P3, P5, and P7. Alternatively, it is possible to determine eight or more measurement points. In addition, it is possible to arbitrarily determine an area for measuring luminance FIG. 7 shows circular symbols each having a predetermined area for each measurement point. The luminance in the predetermined area could be an average of luminance in the measured area. Instead of measuring luminance in the predetermined area, it is possible to measure luminance at a single point of the panel 19 (e.g. each of RGB pixels). It is possible to detect inconsistency of scaling due to the formation of a black band in the periphery of video. Therefore, it is preferable to determine the number of measurement points and the shape of measurement points in correspondence with the shape of a black band to be detected. It is possible to detect a black band by measuring parts having a predetermined value of luminance or less being continuously formed in a band shape.

This is the end of the description concerning the peripheral portion of video displayed on the panel 29, the luminance of which is measured by the peripheral luminance measurement part 2723.

Second Embodiment

Figure 8:
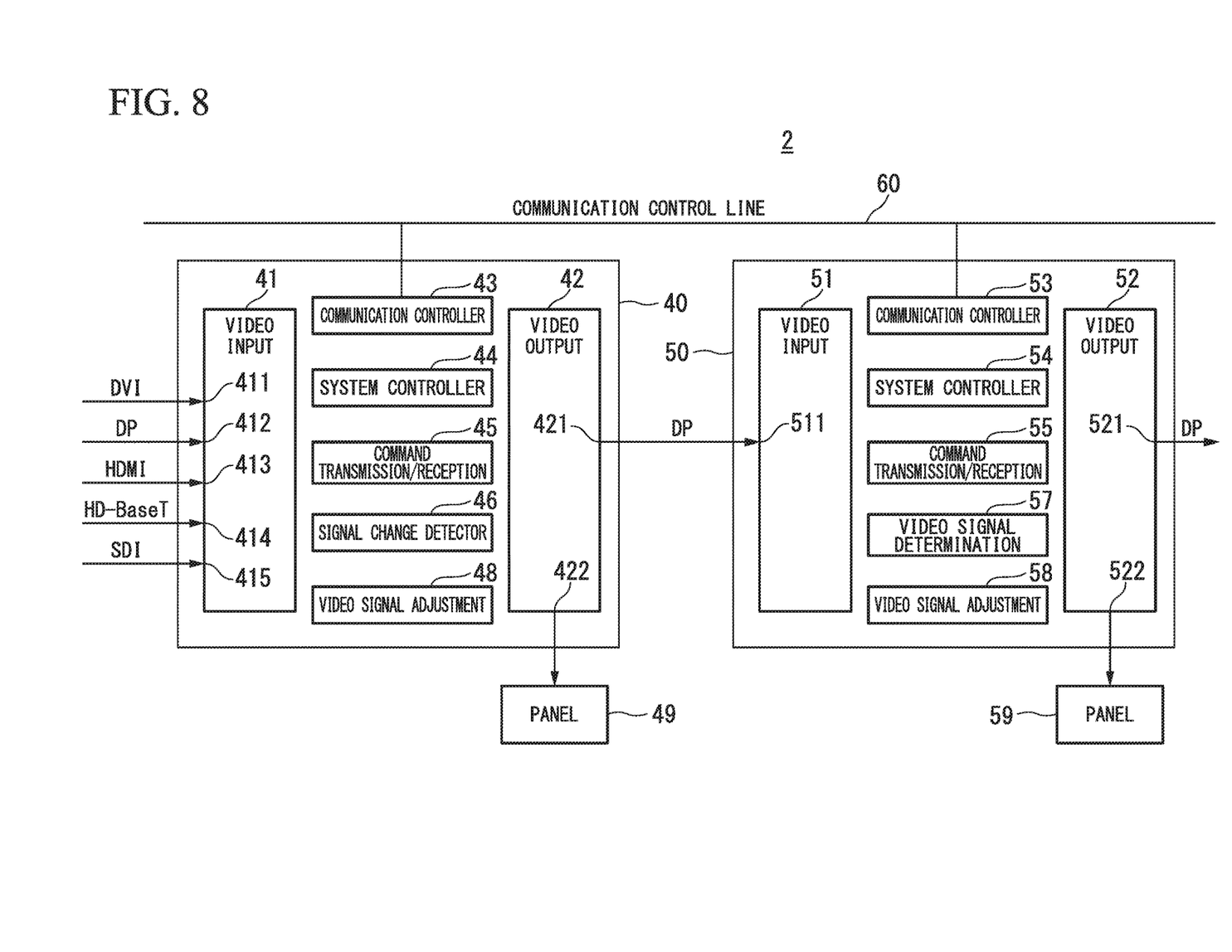
FIG. 8 is a functional block diagram showing the configuration of a display system according to the second embodiment.

Next, a display system according to the second embodiment will be described with reference to FIG. 8. FIG. 8 is a functional block diagram showing the configuration of a display system 2 according to the second embodiment.

In FIG. 8, the display system 2 includes a first display device 40 exemplifying a first display device, a second display device 50 exemplifying a second or subsequent display device, and a communication control line 60. The second embodiment refers to an example of the display system including two display devices, i.e. the first display device 40 and the second display device 50. However, it is possible to reconfigure the display system by further connecting a third or subsequent display device following the second display device 50 by way of daisy chain connection.

The second embodiment refers to the first display device 40 and the second display device 50, each of which has an exclusive-use device configuration. That is, the second embodiment is configured using the first display device 40, which always serves as a display device configured to receive video input signals at first, and the second display 50 serving as a second or subsequent display device. Using the exclusive-use display devices, it is possible to reduce costs by simplifying configurations of display devices. In a display system connecting multiple display devices serving as second and subsequent display devices, in particular, it is possible to reduce costs for second and subsequent display devices.

The first display device 40 includes a video input part 41, a video output part 42, a communication controller 43, a system controller 44, a command transmission/reception part 45, a signal change detector 46, a video signal adjustment part 48, and a panel 49. The first display device 40 does not include the counterpart of the video signal determination part 17 included in the first display device 40. Since the video signal determination part 17 provides the function used for second or subsequent display device; hence, it can be omitted from the first display device.

In the first display device 40, the video input part 41, the video output part 42, the communication controller 43, the system controller 44, the command transmission/reception part 45, the signal change detector 46, the video signal adjustment part 48, and the panel 49 have the same configurations as the video input part 11, the video output part 12, the communication controller 13, the system controller 14, the command transmission/reception part 15, the signal change detector 16, the video signal adjustment part 18, and the panel 19 in the first display device 10; hence, their descriptions will be omitted here.

The second display device 50 includes a video input part 51, a video output part 52, a communication controller 53, a system controller 54, a command transmission/reception part 55, a video signal determination part 57, a video signal adjustment part 58, and a panel 59. The second display device 50 does not include the counterpart of the signal change detector 26 included in the second display device 20. The signal change detector 26 provides the function for detecting any change occurring in video input signals input thereto; hence, it can be omitted from a second or subsequent display device that does not directly receive video input signals.

The video input part 51 has a DP input port 511. The video input part 51 does not include a DVD input part 411, an HDMI input port 413, an HD-BaseT input port 414, and an SDI input port 415. That is, the second embodiment shows that a second or subsequent display device may normally receive DP signals by way of daisy chain connection. By simplifying input ports of the video input part 51, it is possible to reduce costs for second and subsequent display devices. In this connection, the second embodiment shows an example of daisy chain connection for DP signals, for example, it is possible to realize daisy chain connection for DVI signals other than DP signals.

In the second display device 50, the video input part 51, the video output part 52, the communication controller 53, the system controller 54, the command transmission/reception part 55, the video signal determination part 57, the video signal adjustment part 58, and the panel 59 have the same configurations as the video input part 21, the video output part 22, the communication controller 23, the system controller 24, the command transmission/reception part 25, the video signal determination part 27, the video signal adjustment part 28, and the panel 29 in the second display device 20; hence, their descriptions will be omitted here.

This is the end of the description concerning the display system 2 of the second embodiment.

Figure 9:
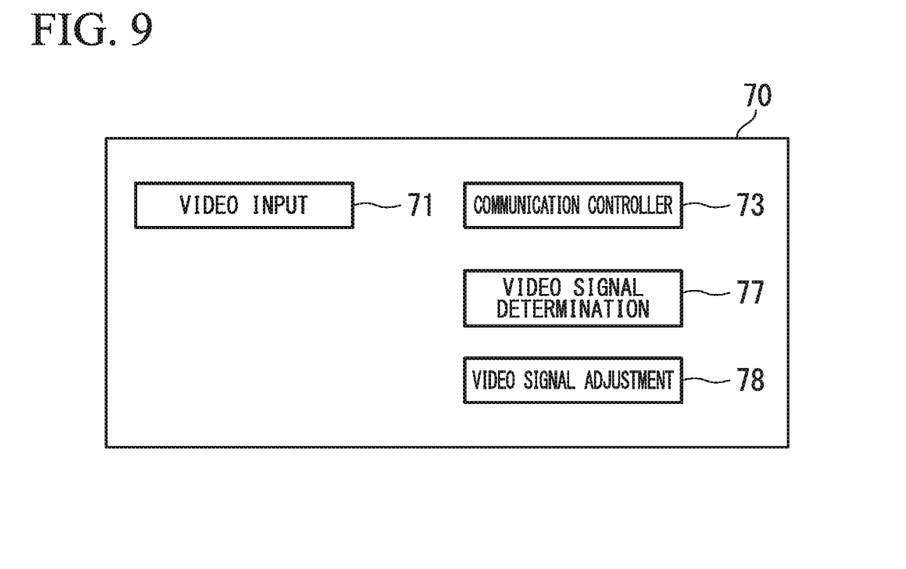
FIG. 9 is a functional block diagram showing the configuration of a display device.

Next, the configuration of a display device will be described with reference to FIG. 9. FIG. 9 is a functional block diagram showing the configuration of a display device.

In FIG. 9, a display device 70 includes a video input part 71 for receiving video signals based on video input signals received by another display device, a communication controller 73 for receiving communication data, representing any change occurring in video input signals, from another display device, a video signal determination part 77 for determining video signals input by the video input part 71 based on communication data received by the communication controller 73, and a video signal adjustment part 78 for adjusting video signals based on the result of determination made by the video signal determination part 77.

This is the end of the description concerning the configuration of the display device 70.

In the above, the first display device 10, the second display device 20, the first display device 40, and the second display device 50 can be each realized using computer connectible to a panel. In this case, programs achieving the foregoing functions of functional blocks can be recorded on computer-readable storage media, and then a computer system may load and execute programs recorded on storage media so as to achieve the foregoing functions. Herein, the "computer system" may embrace OS and hardware such as peripheral devices. The "computer-readable storage media" may refer to flexible disks, magneto-optical disks, ROM, portable media such as CD-ROM, and storage units such as hard disks installed in computer systems. In addition, the "computer-readable storage media" may embrace any measures configured to dynamically hold programs for a short period of time such as communication lines used to transmit programs through telephone lines and networks such as the Internet, or they may embrace any measures configured to hold programs for a certain period of time such as non-volatile memory installed in computer systems serving as servers or clients. The foregoing programs may achieve part of the foregoing functions. Alternatively, they may be combined with other programs pre-installed in computer system so as to achieve the foregoing functions. Moreover, the foregoing functions can be realized using programmable logic devices such as FPGA (Field Programmable Gate Array).

The first display device 10, the second display device 20, the first display device 40, and the second display device 50 can be each realized using a single functional block aggregating multiple functions shown in the above drawings as long as it achieves the foregoing functions as described in FIGS. 1, 3, 6, and 8. Alternatively, it is possible to divide each single functional block shown in the drawings into multiple functional blocks.

Heretofore, the foregoing embodiments of the present invention have been described with reference to the drawings, however, concrete configurations should not be limited to those embodiments; hence, the present invention may embrace any change in design without departing from the essential matters of the invention.

INDUSTRIAL APPLICABILITY

The foregoing embodiments are applicable to display devices, display systems, display methods, and display programs.

In this connection, the following supplementary notes will be further disclosed in connection with the foregoing descriptions.

(Supplementary Note 1)

A display device includes a video input part configured to receive a video signal based on a video input signal received by another display device; a communication controller configured to receive communication data, representing any change occurring in the video input signal, from another display device; a video signal determination part configured to determine the video signal input by the video input part based on the communication data received by the communication controller; and a video signal adjustment part configured to adjust the video signal based on the result of determination made by the video signal determination part.

(Supplementary Note 2)

In the display device as defined in Supplementary Note 1, the video signal determination part measures a minimum luminance and a maximum luminance from the video signal and thereby determines whether or not a range of luminance defined between the minimum luminance and the maximum luminance falls within a predetermined range.

(Supplementary Note 3)

In the display device as defined in Supplementary Note 2, the video signal determination part determines a first gradation range as a gradation range of the video signal when the range of luminance falls within the predetermined range while the video signal determination part determines a second gradation range, having a gradation range broader than the first gradation range, as a gradation range of the video signal when the range of luminance does not fall within the predetermined range, wherein the video signal adjustment part adjusts the gradation range of the video signal based on the gradation range determined by the video signal determination part.

(Supplementary Note 4)

In the display device as defined in any one of Supplementary Notes 1 to 3, the video signal determination part measures a peripheral luminance at the periphery of a video displayed based on the video signal and thereby determines scaling for the video signal.

(Supplementary Note 5)

A display device includes a video output part configured to output a video signal based on a video input signal; a signal change detector configured to detect any change occurring in the video input signal; and a communication controller configured to transmit communication data, representing any change occurring in the video input signal, to another display device when the signal change detector detects any change occurring in the video input signal.

(Supplementary Note 6)

A display system includes a first display device and a second display device.

The first display device further includes a video output part configured to output a video signal based on a video input signal to the second display device, a signal change detector configured to detect any change occurring in the video input signal, and a communication controller configured to transmit communication data, representing any change occurring in the video input signal, to the second display device when the signal change detector detects any change occurring in the video input signal.

The second display device further includes a video input part configured to receive the video signal output from the first display device, a communication controller configured to receive the communication data, representing any change occurring in the video input signal, from the first display device, a video signal determination part configured to determine the video signal input by the video input part based on the communication data received by the communication controller, and a video signal adjustment part configured to adjust the video signal based on the result of determination made by the video signal determination part.

(Supplementary Note 7)

A display method includes a video input process for receiving a video signal based on a video input signal received by another display device; a receiving process for receiving communication data, representing any change occurring in the video input signal, from another display device; a video signal determination process for determining the video signal input in the video input process based on the communication data received in the receiving process; and a video signal adjustment process for adjusting the video signal based on the determination result of the video signal determination process.

(Supplementary Note 8)

In the display method as defined in Supplementary Note 7, the video signal determination process measures a minimum luminance and a maximum luminance from the video signal and thereby determines whether or not a range of luminance defined between the minimum luminance and the maximum luminance falls within a predetermined range.

(Supplementary Note 9)

In the display method as defined in Supplementary Note 8, the video signal determination process determines a first gradation range as a gradation range of the video signal when the range of luminance falls within the predetermined range while the video signal determination part determines a second gradation range, having a gradation range broader than the first gradation range, as a gradation range of the video signal when the range of luminance does not fall within the predetermined range, wherein the video signal adjustment part adjusts the gradation range of the video signal based on the gradation range determined by the video signal determination part.

(Supplementary Note 10)

In the display method as defined in any one of Supplementary Notes 7 to 9, the video signal determination process measures a peripheral luminance at the periphery of a video displayed based on the video signal and thereby determines scaling for the video signal based on the peripheral luminance.

(Supplementary Note 11)

A display method includes a video output process for outputting a video signal based on a video input signal; a signal change detecting process for detecting any change occurring in the video input signal; and a communication control process for transmitting communication data, representing any change occurring in the video input signal, to another display device when the signal change detecting process detects any change occurring in the video input signal.

(Supplementary Note 12)

A display method is adapted to a first display device that implements a video output process for outputting a video signal based on a video input signal to a second display device, a signal change detecting process for detecting any change occurring in the video input signal, and a communication control process for transmitting communication data, representing any change occurring in the video input signal, to the second display device when the signal change detecting process detects any change occurring in the video input signal, and the second display device that implements a video input process for receiving the video signal output from the first display device, a communication control process for receiving the communication data, representing any change occurring in the video input signal, from the first display device, a video signal determination process for determining the video signal based on the communication data received in the communication control process, and a video signal adjustment process for adjusting the video signal based on the determination result of the video signal determination process.

(Supplementary Note 13)

A display program causes a computer to implement a video input process for receiving a video signal based on a video input signal received by another display device; a reception process for receiving communication data, representing any change occurring in the video input signal, from another display device; a video signal determination process for determining the video signal based on the communication data received in the reception process; and a video signal adjustment process for adjusting the video signal based on the determination result of the video signal determination process.

(Supplementary Note 14)

In the display program as defined in Supplementary Note 13, the video signal determination process measures a minimum luminance and a maximum luminance from the video signal and thereby determines whether or not a range of luminance defined between the minimum luminance and the maximum luminance falls within a predetermined range.

(Supplementary Note 15)

In the display program as defined in Supplementary Note 14, the video signal determination process determines a first gradation range as a gradation range of the video signal when the range of luminance falls within the predetermined range while the video signal determination part determines a second gradation range, having a gradation range broader than the first gradation range, as a gradation range of the video signal when the range of luminance does not fall within the predetermined range, wherein the video signal adjustment part adjusts the gradation range of the video signal based on the gradation range determined by the video signal determination part.

(Supplementary Note 16)

In the display program as defined in any one of Supplementary Notes 13 to 15, the video signal determination process measures a peripheral luminance at the periphery of a video displayed based on the video signal and thereby determines scaling for the video signal based on the peripheral luminance.

(Supplementary Note 17)

A display program causing a computer to implement a video output process for outputting a video signal based on a video input signal; a signal change detecting process for detecting any change occurring in the video input signal; and a communication control process for transmitting communication data, representing any change occurring in the video input signal, to another display device when the signal change detecting process detects any change occurring in the video input signal.

(Supplementary Note 18)

A display program is adapted to a first display device that implements a video output process for outputting a video signal based on a video input signal to a second display device, a signal change detecting process for detecting any change occurring in the video input signal, and a communication control process for transmitting communication data, representing any change occurring in the video input signal, to the second display device when the signal change detecting process detects any change occurring in the video input signal, and the second display device that implements a video input process for receiving the video signal output from the first display device, a communication control process for receiving the communication data, representing any change occurring in the video input signal, from the first display device, a video signal determination process for determining the video signal based on the communication data received in the communication control process, and a video signal adjustment process for adjusting the video signal based on the determination result of the video signal determination process.

REFERENCE SIGNS LIST 1, 2 display system
10, 40 first display device
20, 50, 70 second display device
11, 21, 41, 51, 71 video input part
12, 22, 42, 52 video output part
13, 23, 43, 53, 73 communication controller
14, 24, 44, 54 system controller
15, 25, 45, 55 command transmission/reception part
16, 26, 46 signal change detector
17, 27, 57, 77 video signal determination part
17, 28, 48, 58, 78 video signal adjustment part
19, 29, 49, 59 panel

The invention claimed is:

1. A display device, comprising:
a video input part configured to receive a video input signal or a video signal;
a video output part configured to output the video signal;
a communication controller configured to communicate with an other display device; and
a processor configured to execute instructions to:
    detect whether the video input part receives the video input signal including video relevant information representing scaling or a gradation range of a video to be displayed on a screen;
    detect a change of the video input signal upon determining a change of the video relevant information;
    produce communication data representing the change of the video input signal;
    transmit the communication data to the other display device configured to receive the video signal;
    adjust the video signal in terms of the scaling or the gradation range according to the video relevant information when the video input part receives the video input signal, or adjust the video signal in terms of the scaling or the gradation range according to the communication data when the video input part receives the video signal;
    measure a peripheral luminance at a plurality of measuring points only, the plurality of measuring points being disposed in a periphery of a video displayed based on the video signal; and
    adjust the scaling for the video signal based on the peripheral luminance,
wherein the video relevant information includes:
    scan information indicating the scaling; and
    an RGB quantization range indicating the gradation range.

2. A display method adapted to a display device configured to input a video input signal or a video signal and to thereby output the video signal in communication with an other display device, the display method comprising:
detecting whether to receive the video input signal including video relevant information representing scaling or a gradation range of a video to be displayed on a screen;
detecting a change of the video input signal upon determining a change of the video relevant information;
producing communication data representing the change of the video input signal;
transmitting the communication data to the other display device configured to receive the video signal;
adjusting the video signal in terms of the scaling or the gradation range according to the video relevant information upon receiving the video input signal, or adjusting the video signal in terms of the scaling or the gradation range according to the communication data upon receiving the video signal;
measuring a peripheral luminance at a plurality of measuring points only, the plurality of measuring points being disposed in a periphery of a video displayed based on the video signal; and
adjusting the scaling for the video signal based on the peripheral luminance, wherein the video relevant information includes;
scan information indicating the scaling; and
an RGB quantization range indicating the gradation range.

3. A non-transitory computer-readable storage medium having stored a display program causing a computer to implement the display method according to claim 2.

4. The display device according to claim 1, wherein the video relevant information represents the adjustment of the scaling and the gradation range.

5. The display device according to claim 1, wherein the video input signal is determined based on the communication data received by the communication controller.

6. The display device according to claim 1, wherein the processor executes instructions to identify the video input signal including the video relevant information and a video signal precluding the video relevant information to send video signals to the other display device.

7. A display device, comprising:
a video input part configured to receive a video input signal or a video signal;
a video output part configured to output the video signal;
a communication controller configured to communicate with an other display device; and
a processor configured to execute instructions to:
detect whether the video input part receives the video input signal including video relevant information representing scaling or a gradation range of a video to be displayed on a screen;
detect a change of the video input signal upon determining a change of the video relevant information;
produce communication data representing the change of the video input signal;
transmit the communication data to the other display device configured to receive the video signal; and
adjust the video signal in terms of the scaling or the gradation range according to the video relevant information when the video input part receives the video input signal, or adjust the video signal in terms of the scaling or the gradation range according to the communication data when the video input part receives the video signal,
wherein, upon inputting the video signal into the other display device, the other display device determines the scaling and the gradation of the video signal based on the communication data from the display device.

8. The display method according to claim 2, wherein the video relevant information represents the adjustment of the scaling and the gradation range.

9. The display method according to claim 2, wherein the video input signal is determined based on the communication data.

10. The display method according to claim 2, wherein the detecting whether to receive the video input signal includes identifying the video input signal including the video relevant information and a video signal precluding the video relevant information to send video signals to the other display device.

11. A display method adapted to a display device configured to input a video input signal or a video signal and to thereby output the video signal in communication with an other display device, the display method comprising:
detecting whether to receive the video input signal including video relevant information representing scaling or a gradation range of a video to be displayed on a screen;
detecting a change of the video input signal upon determining a change of the video relevant information;
producing communication data representing the change of the video input signal;
transmitting the communication data to the other display device configured to receive the video signal; and
adjusting the video signal in terms of the scaling or the gradation range according to the video relevant information upon receiving the video input signal, or adjusting the video signal in terms of the scaling or the gradation range according to the communication data upon receiving the video signal,
wherein, upon inputting the video signal into the other display device, the other display device determines the scaling and the gradation of the video signal based on the communication data from the display device.

12. The display device according to claim 1, wherein the communication data is transmitted from the communication controller of the display device to a communication controller of the other display device.

13. The display device according to claim 1, further comprising a signal change detector that detects the change of the video input signal indicating a change of the gradation range or the scaling which is detected due to the change of the video relevant information.

14. A display device, comprising:
a video input part configured to receive a video input signal or a video signal;
a video output part configured to output the video signal;
a communication controller configured to communicate with an other display device; and
a processor configured to execute instructions to:
detect whether the video input part receives the video input signal including video relevant information representing scaling or a gradation range of a video to be displayed on a screen;
detect a change of the video input signal upon determining a change of the video relevant information;
produce communication data representing the change of the video input signal; transmit the communication data to the other display device configured to receive the video signal; and
adjust the video signal in terms of the scaling or the gradation range according to the video relevant information when the video input part receives the video input signal, or adjust the video signal in terms of the scaling or the gradation range according to the communication data when the video input part receives the video signal,
wherein the other display device determines the gradation range and the scaling according to the communication data to prevent inconsistency between a video displayed on the display device and a video displayed on the other display device.

* * * * *